United States Patent [19]
Kollberg

[11] Patent Number: 4,651,800
[45] Date of Patent: Mar. 24, 1987

[54] LEVEL METER IN A MOLD FOR CONTINUOUS CASTING

[75] Inventor: Sten Kollberg, Västerås, Sweden

[73] Assignee: Asea AB, Västerås, Sweden

[21] Appl. No.: 702,743

[22] Filed: Feb. 19, 1985

[30] Foreign Application Priority Data

Mar. 19, 1984 [SE] Sweden ............................... 8401505

[51] Int. Cl.⁴ ..................... B22D 27/02; B22D 2/00
[52] U.S. Cl. ................................... 164/150; 164/504; 164/449
[58] Field of Search ................ 164/468, 504, 150, 4.1, 164/449, 499, 147.1

[56] References Cited

U.S. PATENT DOCUMENTS 4,462,458  7/1984  Ruer ..................................... 164/504

Primary Examiner—Kuang Y. Lin
Attorney, Agent, or Firm—Kenyon & Kenyon

[57] ABSTRACT

A level meter in a mold for continuous casting has an assembly including a continuous casting mold, an annular multi-phase electromagnetic stirrer surrounding the mold, and a source of radioactivity projecting a beam of radiation through the mold, a detector for the beam being positioned on the opposite side of the mold. To permit the stirrer to have a height providing optimum stirring, two of the coils of the stirrer have portions of reduced height forming spaces opposite to each other and through which the beam can be projecting to the detector. Therefore, the height of the stirrer need not be reduced to provide for the beam and detector arrangement.

4 Claims, 6 Drawing Figures

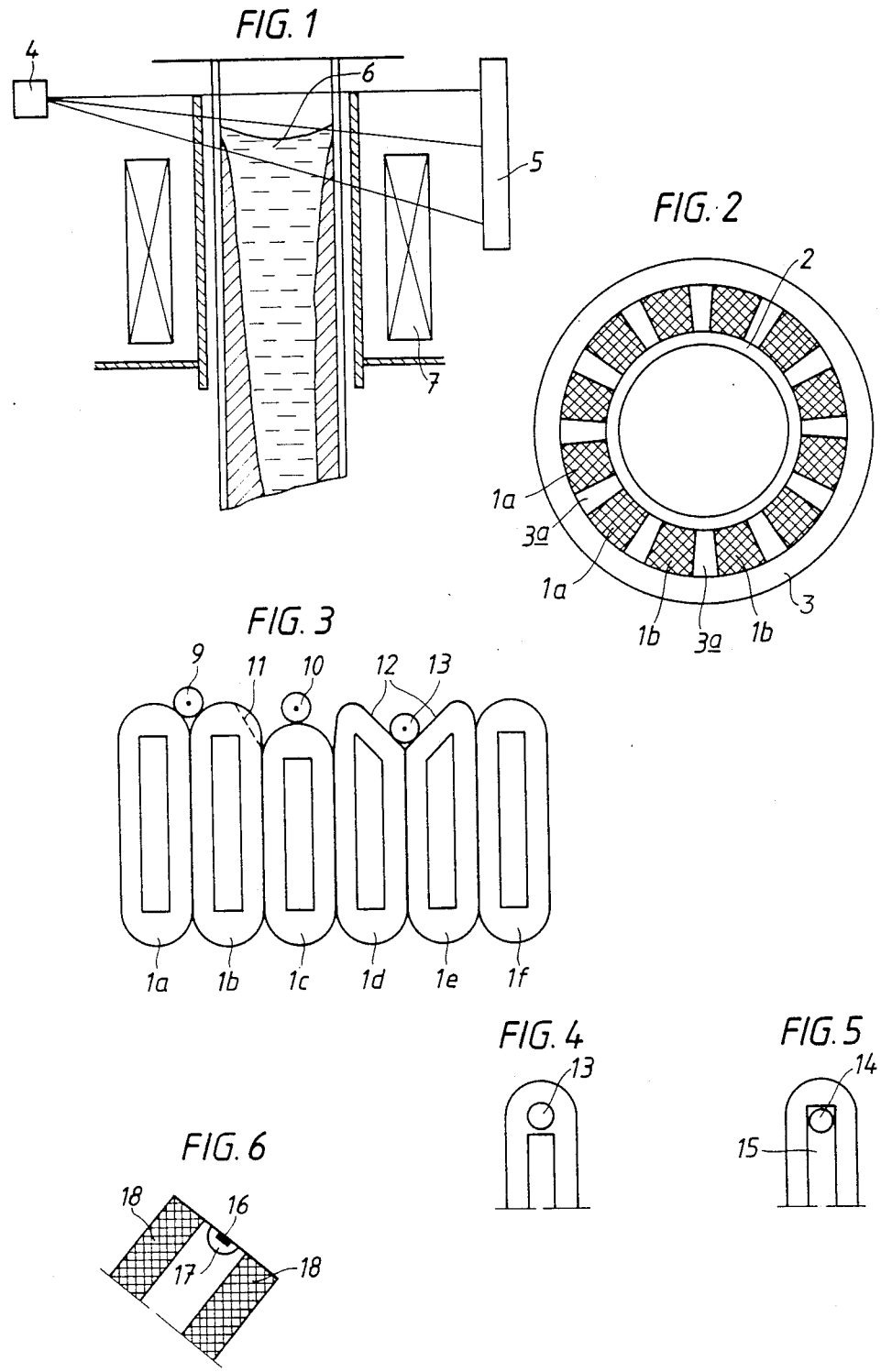

LEVEL METER IN A MOLD FOR CONTINUOUS CASTING

BACKGROUND OF THE INVENTION

A level meter in a mold for continuous casting comprises a continuous casting mold, a stirrer comprising a continuous series of vertically elongated coils of wire surrounded by a core having pole pieces extending through the coils towards the mold and forming a multiphase stirrer surrounding the mold, and means for metering or detecting the top level of the molten metal being cast into the mold so as to determine the rate at which the metal cast in the mold should be supplied.

Such a means can be provided by a radioactive source of radiation positioned outside of the mold to project a beam of radiation through the mold via one of its sides, and a radiation detector for the beam on the opposite side of the mold. When the metal in the mold intercepts the beam the level is detected and the rate at which the metal is supplied the mold can be increased or decreased to maintain a desired level of molten metal in the mold, keeping in mind that metal is continuously feeding from the mold in the form of a partially solidified continuously cast strand.

The purpose of the stirrer is to electromagnetically stir the molten metal in the mold as it progressively solidifies while passing downwardly through the mold which is cooled to solidify the metal at least at its part in contact with the mold. It may be desirable to stir the molten metal in the mold close to the upper surface of the metal, and for this the stirrer with its coils and pole pieces must extend from the mold's lower portion upwardly around the mold to the required level.

It is the purpose of the level meter to detect the melt level so as to maintain it safely close to the upper limit of the field of the stirrer, requiring the radiation source and detector to be positioned at least slightly below the top level of the electromagnetic stirrer. To accomodate this positioning it has been proposed that the coils and pole pieces of the stirrer be circumferentially separated so as to form gaps or spaces for the radiation source and detector.

The above gaps result in the coils and pole pieces of the stirrer being unsymmetrical and it has been found that the stirring action of the metal in the mold is not as effective as might be desired.

It is conceivable to design a stirrer with its coils juxtapositioned and its pole pieces symmetrically arranged without the gaps, by shortening the otherwise desirable vertical extent or height of the stirrer so that the radiation source and detector can be positioned at a level above the stirrer. This expedient prevents stirring of the metal near the top of the mold.

SUMMARY OF THE INVENTION

According to the present invention the stirrer's coils are juxtapositioned and in contact with each other and the pole pieces of the stirrer surrounding the mold are circumferentially symmetrically positioned. The level meter is formed by means for projecting a beam of energy such as the radiation through the mold via one of the mold's sides horizontally at a beam level below the top level of the stirrer, together with a detector for the beam on the opposite side of the mold and at the same beam level. To do this without requiring the gaps, spaces are formed in either the pole pieces or by the coils themselves, and the radiation source and its detector are accommodated by these spaces. Making the stirrer with its coils and pole pieces juxtapositioned circumferentially permits the design of a symmetrical arrangement of the coils and particularly the pole pieces. The beam and its detector operate in a horizontal plane below the top level of the stirrer without requiring the stirrer to be made asymmetrical as required by interrupting its circumferential continuity to form the gaps between the coils. This permits the stirrer to be designed with its coils and pole pieces vertically elongated so as to extend vertically to stir the metal in the mold at a level as high as desired with the metal level controlled by the melt level metering arrangement.

DESCRIPTION OF THE DRAWINGS

The invention is disclosed in detail herein below with the aid of the accompanying drawings in which:

FIG. 1 is a vertical sectional view schematically indicating the problem solved by this invention;

FIG. 2 is a horizontal cross-sectional view showing schematically the arrangement of the coils and pole pieces symmetrically positioned;

FIG. 3 is an elevation view in linear form showing a section of the pole pieces and coils and illustrating preferred forms of the invention;

FIG. 4 is a segment of FIG. 3 and shows a possible modification;

FIG. 5 is also a segment and shows a further possible modification; and

FIG. 6 shows a segment of FIG. 2 and a still further possible modification of the invention.

DETAILED DESCRIPTION OF THE INVENTION

Referring first to FIG. 2, an annular multi-phase stirrer is represented with its coils 1a, 1b, etc. juxtapositioned so as to surround a water-cooled copper continuous casting mold 2, and having an annular core 3 providing radially inwardly extending pole pieces 3a symmetrically arranged relative to each other. The symmetrical arrangement of the pole pieces provide for optimum stirring of metal being continuously cast in the mold 2. In this FIG. 2 the coils are shown as merging with each but actually each pole piece is surrounded by its own individual coil.

FIG. 1 is provided to show the difficulties associated with the prior art practice where the radiation source and detector were positioned beyond the outer circumference of the stirrer. In this figure the detector is shown at 5 and the source of radiation at 4, the intent being to meter the level of the melt being cast in the continuous casting mold where its meniscus is shown at 6. Desirably the elements 4 and 5 should be arranged so that the beam of energy is horizontal with respect to the upper limits of the meniscus 6, this being possible in FIG. 1 only because the vertical height or extent of the multi-phase stirrer 7 has been decreased more than is desirable.

In FIG. 3 in a linear display the vertically elongated coils 1a, 1b, etc. are shown. If the radiation source and/or its detector are positioned as indicated at 9 so as to avoid a physical horizontal separation of the coils 1a and 1b, the radiation beam level is above that of the top of the stirrer. To detect melt in the mold 2 at a lower level requires undesirable shortening of the height of the stirrer coils and pole pieces.

According to the present invention the coil 1c is shortened in height, this applying also to the diametrically opposite coil of the stirrer, the bottom of the coil being at the same level as the other coils, its top level being lower so as to now permit the positioning of the beam source and its detector, indicated at 10, at a level lower than that of the balance of the stirrer. Consequently the height of the entire stirrer can be increased to permit stirring of the metal at or close to the upper rim of its meniscus 6 shown in FIG. 1. To provide an even lower space for positioning the radiation source and its detector providing a horizontal beam at a beam level below the level of the top of the stirrer, one of the coils, such as the coil 1b, can be beveled or chamferred as at 11, this possibility being even more emphasized in the case of the coils 1d and 1e where both coils are beveled or chamferred towards each other so as to permit an even lower space in which the radiation source and detector can be positioned well below the top level of the stirrer, as indicated at 13.

It is to be understood that in connection with the above the various core pole pieces 3a of the stirrer should be appropriately dimensional and/or contoured in cross-section.

FIG. 4 serves to show that the core and/or the radiation source 13 can be actually built into the two coils of the stirrer by forming a hole or recess 13a, while FIG. 5 indicates that the hole or recess can be formed at 14 in the core 15 of the two diametrically opposite parts of the stirrer.

FIG. 6 serves to show a possible alternative for saving space, wherein a radioactive compound 16 for the radiation source, is positioned in a recess 17 formed in the front of one of the pole pieces, the detector thus being positioned in a similar recess in the opposite pole piece, the compound being provided with lead shielding. In this FIG. 6, one of the coils is shown at 18.

In all of the foregoing it is to be understood that the radiation source projects a beam of energy through the mold via one of its sides through the upper limit of the meniscus 6, and to the radiation detector, as indicated at 4, on the opposite side of the mold. As the melt level rises it intercepts the beam and by the usual equipment provides a signal, permitting control of the casting rate into the continuous casting mold. With the present invention the vertical extent of the annular or toridal multi-phase stirrer can be increased with the horizontal projection of the beam of energy through the mold via one of its sides, at a beam level below the top level of the stirrer, the beam detector being on the opposite side of the mold and at the beam level. The vertical distribution of the stirring action of the stirrer is not limited and the stirrer itself can be made with circumferentially symmetrically arranged coils and their necessary core and pole pieces which extend inwardly through the coils towards the continuous casting mold.

What is claimed is:

1. Apparatus for continous casting and comprising a continuous casting mold, an annlar multi-phase stirrer surrounding the mold and electromagnetically stirring a melt in the mold, said stirrer comprising an annular series of vertically elongated wire coils which are juxtapositioned in contact with each other and free from gaps in the circumferential directon of the stirrer, said stirrer having a circumferentially continuous annular core free from gaps in the circumferential direction and having pole pieces extending radially inwardly through the coils and towareds the mold, said apparatus including a melt level meter having a beam projector projecting a beam through the mold and positioned on one side of the mold, the projector and a detector being positioned diametrically oppostie to each other at a horizontal level at least partially below the top level of the stirrer, said stirrer having diametrically opposite spaces having openings facing the mold, and forming clearance for a beam projected from the beam projector to the beam detector.

2. The apparatus of claim 1, in which two of the coils which are diametrically opposite to each other have at least portions which are below the top level of the stirrer so as to form said spaces in which the means and detector are accomodated without interrupting the circumferential continuity of said stirrer.

3. The apparatus of claim 2 in which at least one of said two of the coils has a beveled top slanting downwardly towards a next juxtapositioned coil so as to form one of said spaces.

4. The apparatus of claim 1, in which a diametrically opposite two of the pole pieces have said recesses formed therein.

* * * * *